2,886,557
GLYOXAL CROSS-LINKED ACRYLAMIDE COPOLYMERS

Pierre Alfred Talet, Paris, France, assignor to Société Nobel Française, Paris, France, a French joint-stock company No Drawing. Application July 14, 1955
Serial No. 522,181

3 Claims. (Cl. 260—72)

The majority of thermoplastic resins obtained by polymerization or co-polymerization of monomers having ethylene double bonds have only a limited scope of applications due to their sensitivity to heat, their solubility in organic solvents and their insufficient surface hardness.

In certain cases, one may overcome these difficulties by raising the degree of polymerization, or by fixation of suitable lateral groups, or by a mechanical drawing operation, etc.

These different treatments are susceptible to raising the point of softening of the resin or to decreasing its solubility in organic solvents. Nevertheless, the improvement in the properties of the resin in this direction remains often insufficient. On the other hand, it was found that a far-reaching modification of the properties of the polymer may be obtained if a lattice formation can be initiated by establishing chemical bonds between the chains of macromolecules.

The present invention is concerned with a process for the introduction of a sufficient number of elementary active units into the chain of the polymer which is straight or slightly branched with a view to enabling an easy transformation of the polymer structure into a three-dimensional network.

According to an advantageous feature of the invention, the elementary units consist of acrylamide radicals, which, due to the presence of the active amido groups, cause the formation of cross-links between the straight chains by virtue of a reaction with compounds of the polyisocyanate, formaldehyde or polyaldehyde type.

According to a modification, it is found advantageous to transform by hydrolysis the amido groups into carboxyl-groups, the vulcanization taking place between the carboxyl-groups of the different chains by means of a reaction with polyalcohols, polyamines and polyvalent inorganic bases.

According to another modification, acrylamide may be replaced by methacrylamide.

The tendency of the copolymers into which acrylamide units have been introduced to be vulcanized in the presence of the reagents cited above shall be illustrated by the following examples which are purely explanatory and impose no limitations:

Example 1

Polymerization of vinylacetate to which 2% acrylamide has been added is carried out under the usual conditions. A dispersion of the copolymer in the form of beads is obtained.

These beads are soluble in dichloroethane, benzene, toluene and mixtures of alcohol-dichloroethane and acetone-benzene.

A solution of the following composition is prepared:

| | Parts |
|---|---|
| Copolymer beads | 20 |
| Dichloroethane | 80 |

To the so-called "collodion" solution thus obtained 0.2 part of toluylene-di-isocyanate is added.

This collodion, when poured over a glass surface, leaves after drying, a film which shows an improved resistance to water and heat compared to a control film of pure polyvinylacetate of the same degree of polymerization.

Example 2

98 parts by weight of beads, prepared according to Example 1, are ground with 2% of a mixture obtained from two moles of ethylacetate per mole of toluylene-di-isocyanate. The powder obtained is cast under a pressure of 200 kg./mm.$^2$ and at a temperature of 190° C. The translucent casts thus prepared are kept in boiling water for one hour. A slight softening is noticed, but no deformation takes place. Moreover, the solubility in dicloroethane has disappeared.

Example 3

The beads obtained in Example 1 are hydrolyzed in the following manner:

100 parts by weight of said beads are mixed with 100 parts of 20% sulfuric acid and the whole is heated to a temperature of 100° C. After a 30 minute treatment, the mass is poured into a large excess of water, washed and dried at a temperature not exceeding 60° C. The resulting product is treated with 200 parts of toluene, 3 parts of pentacrythrite and 1 part of p-toluenesulfonic acid added as a catalyst. The esterification of the carboxyls formed on the molecular chains is obtained after heating under reflux for one hour.

The resulting product is a resin having a distinctly higher melting point than that of the initial copolymer.

Example 4

Polymerization of the following mixture is carried out under reflux:

| | Parts |
|---|---|
| Vinyl acetate | 29.4 |
| Acrylamide | 0.6 |
| Benzoyl peroxide | 0.15 |
| Toluene | 70 |

The film obtained at ordinary temperature is harder and shows a higher resistance to water (compared to a film of unmodified vinyl acetate), if 1% of a freshly prepared mixture of the following composition is added to the collodion:

| | Moles |
|---|---|
| Ethyl acetate glycol | 2 |
| Toluylene-di-isocyanate | 2.5 |

Even a prolonged immersion does not bleach this film. Heating in an oven at 105° C. during a period of 1 hour still improves these properties although a rather strong yellow coloration is produced.

A mixture of acetyl ethylacetate and toluylene-di-isocyanate in the same proportions as those indicated for the mixture of ethyl acetate, glycol and toluylene-di-isocyanate leads to identical results.

Example 5

An emulsion of the following composition is prepared:

| | Parts |
|---|---|
| Water | 230 |
| Sodium sulforicinate | 4 |
| Condensation product of oleic alcohol with 20 moles of ethylene oxide | 0.7 |
| Methylacrylate | 166 |
| Acrylamide | 4 |
| Ammonium persulphate | 0.53 |

Polymerization is carried out under reflux until the internal temperature reaches 85° C. Then 2% of 36.5% formaldehyde is added and the pH is brought to 2.8 by the addition of acetic acid.

In order to obtain a film of 0.30 mm. thickness the emulsion is spread. Test strips of 30 mm. width and 120 mm. length are cut out. After 24 hours, a number of these strips which have been kept at ordinary temperature, are submitted to a tensile stress with an average strength of 0.28 kg./mm.$^2$.

A certain number of strips heated for one hour at 105° C. and then brought to ambient temperature showed an average mechanical strength of 1 km./mm.$^2$. It follows therefore that the vulcanization due to the methylol group is accelerated by a thermal treatment. However, this treatment is not indispensable. Given sufficient time, the vulcanization takes place in the film even at ordinary temperature by virtue of the acid properties conferred thereto.

*Example 6*

If 5 grm. of a 15% glyoxal solution is added to 100 grms. of the emulsion mentioned in Example 4, it may be observed, after pouring the substance on a glass surface, that the film adheres strongly to the glass support. After heating in the oven, the substance is no longer soluble in acetone. The film obtained is transparent.

If the pH is adjusted to 2, for instance, by the addition of formic acid, the substance becomes soluble in acetone even at ordinary temperature.

*Example 7*

A collodion of the following composition is prepared:

| | Parts |
|---|---|
| Toluene | 240 |
| Methyl acrylate | 100 |
| Acrylamide | 1 |
| Benzoyl peroxide | 1 |

The mixture is refluxed for 3 hours at 80° C. and a perfectly clear collodion is obtained of 30% concentration.

2% of toluylene-di-isocyanate is added to a portion of the collodion. After a contact time of 5 minutes, the resin is precipitated with water and dried at 105° C. for 30 minutes. The initial solubility in acetone and toluene has disappeared.

If the substance is spread in films a hard and very water-resistant resin is obtained.

*Example 8*

Formaldehyde may be introduced in the form of its polymer trioxane.

1 gr. of trioxane is added to 100 grms. of collodion prepared according to Example 6.

When the trioxane is dissolved, by the addition of 1 gm. of benzene sulfonic acid, a thickening under heat is produced with final setting to a sticky gel.

This gel, when poured on a glass or steel surface and heated in an oven at 100° C. for one hour, gives a hard film which is insoluble in acetone.

The polymers obtained according to the invention may be used for the manufacture of varnishes, paints, casting powders, synthetic fibers, coatings, dressings, adhesives, etc.

It is to be understood, moreover, that the present invention has only been described in an explanatory and not restrictive manner and that any useful modification may be made within the limits of its scope.

I claim:

1. A process for obtaining a modified thermoplastic resin of the group consisting of vinylacetate and methacrylic esters which is harder, more insoluble in organic solvents and more highly heat resisting than said unmodified resin, said process consisting in copolymerizing a monomer from said group with approximately 1 to 2% by weight acrylamide, adding a small amount of at least .75% by weight glyoxal to the copolymer resulting from said copolymerizing step, mixing said copolymer and said glyoxal and subjecting them to a reaction temperature ranging from 25° C. to 105° C., whereby a polymer is obtained having the structure of a three-dimensional network.

2. A process for obtaining a modified thermoplastic resin of the group consisting of vinylacetate and methacrylic esters which is harder, more insoluble in organic solvents and more highly heat resisting than said unmodified resin, said process consisting in copolymerizing a monomer from said group with approximately 1 to 2% by weight methacrylamide, adding a small amount of at least .75% by weight glyoxal to the copolymer resulting from said copolymerizing step, mixing said copolymer and said glyoxal, and subjecting them to a reaction temperature ranging from 25° C. to 105° C., whereby a polymer is obtained having the structure of a three-dimensional network.

3. A process for obtaining a modified thermoplastic resin of vinyl acetate, said process consisting in copolymerizing vinyl acetate and 2% by weight of acrylamide, adding to 100 grams of the copolymer resulting from said copolymerizing step, 5 grams of a 15% glyoxal solution, mixing said copolymer and said glyoxal and subjecting them to a reaction temperature ranging from 25° C. to 105° C., whereby a polymer is obtained that is insoluble and heat resisting, said polymer having the structure of a three-dimensional network.

References Cited in the file of this patent

UNITED STATES PATENTS

| 2,381,063 | Kung | Aug. 7, 1945 |
| 2,510,886 | Greenlee | June 6, 1950 |
| 2,678,924 | Graulich et al. | May 18, 1954 |

FOREIGN PATENTS

| 557,159 | Great Britain | Nov. 8, 1943 |
| 676,376 | Great Britain | July 23, 1952 |

OTHER REFERENCES

Fraenkel-Conrat et al.: Journal Am. Chem. Soc., August 1948 (pages 2673 and 2674).